United States Patent Office 3,441,598
Patented Apr. 29, 1969

3,441,598
ACRYLATE PRODUCTION
Richard L. Rowton, Austin, Tex., assignor to Jefferson Chemical Company, Inc., Houston, Tex., a corporation of Delaware
No Drawing. Filed Jan. 6, 1966, Ser. No. 518,990
Int. Cl. C07c 67/00
U.S. Cl. 260—486                                4 Claims

ABSTRACT OF THE DISCLOSURE

The invention is an improved process for the production of acrylates wherein acrylic or methacrylic acid is initially mixed with at least a stoichiometric amount of an alkylene oxide, based on the chlorine content of aluminum trichloride catalyst, followed by sequential addition of the aluminum trichloride catalyst and an amount of alkylene oxide which is at least equivalent to the amount of acrylic or methacrylic acid initially employed.

---

This invention relates to the production of hydroxyalkyl acrylates and methacrylates. More particularly, this invention relates to an improved method for the production of hydroxyalkyl acrylates and methacrylates by the aluminum chloride-catalyzed reaction of an alkylene oxide with acrylic or methacrylic acid.

In Wright et al. U.S. Patent No. 3,150,167, dated Sept. 22, 1964, and entitled, "Process for Preparing Hydroxyalkyl Acrylates and Methacrylates," there is disclosed a method wherein aluminum trichloride is mixed with acrylic acid or methacrylic acid, followed by the addition of an alkylene oxide in order to bring about the formation of a corresponding hydroxyalkyl acrylate or methacrylate. Although the process disclosed in this patent is generally satisfactory, there has been much to be desired, particularly with reference to the control of reaction conditions and corrosion. Thus, for example, when aluminum trichloride is added to acrylic or methacrylic acid in accordance with the Wright et al. process, it reacts directly and rapidly with the acid, liberating copious quantities of hydrogen chloride gas.

It has now been discovered that the foregoing and related problems can be overcome by an improved process wherein acrylic or methacrylic acid is initially mixed with at least a stoichiometric amount of an alkylene oxide, based on the chlorine content of the aluminum trichloride catalyst, followed by sequential addition of the aluminum trichloride catalyst and an amount of alkylene oxide which is at least equivalent to the amount of acrylic or methacrylic acid initially employed. When this is done, the epoxide reacts substantially quantitatively with the hydrogen chloride as it is formed, thus eliminating a serious manufacturing problem.

The starting materials for the present invention include acrylic acid or methacrylic acid. Methacrylic acid is preferred. An alkylene epoxide such as ethylene oxide, propylene oxide or butylene oxide is used as a coreactant. Propylene oxide is a preferred epoxide. Normally, the reactants are used in equimolar proportions, although an excess of alkylene oxide (e.g., up to 20% by weight, or more) is preferably employed in both of the epoxide addition steps.

The reaction is preferably conducted at a temperature within the range of about 40° to about 150° C., and, more preferably, at a temperature within the range of about 50° to about 100° C. The reaction is normally run until the acid number of the acid reactant has been brought below 20, and preferably in the range of about 5 to 15. Usually, this will occur in from about 40 to 120 minutes, the longer times being necessary at lower temperatures.

The reaction may be conducted at atmospheric or superatmospheric pressure, although atmospheric pressure is preferred. Inert diluents such as aromatic hydrocarbons (e.g., xylene) and alcohols (e.g., butanol) may be used if desired, but it is generally preferable to operate without a solvent.

The catalyst to be employed in accordance with the present invention is aluminum trichloride. Usually, the amount of catalyst utilized will fall within the range of about 0.5 to about 3 parts by weight of catalyst per 100 parts of acrylic component. Larger amounts of catalyst may be employed if desired, but there is no particular advantage.

The invention will be illustrated by the following specific examples, which are given by way of illustration and not as limitations on the scope of this invention.

Example I

Dry methacrylic acid was charged to a nitrogen padded kettle. The kettle was opened, and a phenolic oxidation inhibitor and about 3.6 parts of anhydrous aluminum chloride per 100 parts of methacrylic acid were charged through the open port. Copious quantities of hydrogen chloride were evolved and the hydrogen chloride vented through the open port in such quantities as to prevent closing of the port until fuming had ceased. However, when fuming had substantially ceased, the kettle was closed and heated to a temperature of about 60° to 70° C. Thereafter, propylene oxide was slowly added at a temperature of about 85° to 95° C. in excess of the stoichiometric amount of propylene oxide required for reaction with methacrylic acid.

After the kettle was closed and the contents heated, additional fuming occurred, as evidenced by a rapid increase in kettle pressure to about 20 p.s.i. The pressures dropped immediately after the addition of propylene oxide was started.

Example II

By way of illustration of the present invention, 301 parts of methacrylic acid and 0.3 part of hydroquinone monomethylether were added to a stainless steel pressure vessel together with 17 parts of propylene oxide. 10.8 parts of granular aluminum chloride was thereafter added and the vessel was closed. There was no evidence of fuming. Thereafter, the reaction vessel was heated to a temperature of about 80° C. and 200 parts of propylene oxide were added over a 30-minute period at this temperature. No problems were encountered with respect to excessive pressure buildup in the kettle or excessive and erratic reaction of the propylene oxide.

At the end of the reaction period, the reaction product was washed at room temperature with a solution of 32.5 parts of 85% phosphoric acid and 9.3 parts of trisodium phosphate dodecahydrate in 145 parts of water. The organic layer was washed a second time with a solution of 45 parts of sodium chloride in 135 parts of water.

A water-white product containing about 10 wt. percent of water was obtained as a result of this procedure.

Having thus described my invention, what is claimed is:

1. In a method for the preparation of a hydroxy compound selected from the group consisting of hydroxyalkyl acrylates and methacrylates by the reaction of an alkylene epoxide with an acrylic component selected from the group consisting of acrylic and methacrylic acid in the presence of aluminum trichloride, the improvement which comprises the steps of initially mixing said acrylic component with an alkylene oxide selected from the group consisting of ethylene oxide, propylene oxide and butylene oxide, employing at least about a stoichiometric amount of the alkylene oxide based upon the amount of aluminum trichloride catalyst to be employed, next adding aluminum trichloride catalyst and thereafter adding at least an equivalent amount of said alkylene oxide, based on said acrylic component until the acid number of the reaction mixture is less than about 20.

2. A method as in claim 1 wherein from about 0.5 to about 3 parts by weight of catalyst per 100 parts of acrylic component is employed.

3. A method as in claim 1 wherein the reaction conditions employed include a temperature within the range of about 50° C. to about 100° C. and a reaction time within the range of about 40 to about 120 minutes.

4. A method as in claim 3 wherein the acrylic component is methacrylic acid and wherein the epoxide is propylene oxide.

References Cited

UNITED STATES PATENTS

| 2,327,053 | 8/1943 | Marple et al. | 260—611 |
| 3,150,167 | 9/1964 | Wright et al. | 260—486 |
| 3,274,220 | 9/1966 | Budde | 260—404.5 |

FOREIGN PATENTS

| 871,767 | 6/1961 | Great Britain. |

OTHER REFERENCES

Hantzsch et al., Ber. vol. 40 pp. 1514–15 (1907).

LORRAINE A. WEINBERGER, *Primary Examiner.*

A. P. HALLUIN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,441,598

April 29, 1969

Richard L. Rowton

It is certified that error appears in the above identified patent and that said Letters Patent are hereby corrected as shown below:

Column 3, line 2, between "catalyst" and "and" insert -- maintaining a temperature within the range of about 40° C. to about 150° C. --.

Signed and sealed this 15th day of December 1970.

(SEAL)
Attest:

Edward M. Fletcher, Jr.
Attesting Officer

WILLIAM E. SCHUYLER, JR.
Commissioner of Patents